United States Patent
Shah

(10) Patent No.: US 9,952,809 B2
(45) Date of Patent: Apr. 24, 2018

(54) SELF DESTROYING LUN

(71) Applicant: Dell Products, LP, Round Rock, TX (US)

(72) Inventor: Parind Shah, Chelmsford, MA (US)

(73) Assignee: DELL PRODUCTS, L.P., Round Rock, TX (US)

( * ) Notice: Subject to any disclaimer, the term of this patent is extended or adjusted under 35 U.S.C. 154(b) by 305 days.

(21) Appl. No.: 14/070,057

(22) Filed: Nov. 1, 2013

(65) Prior Publication Data

US 2015/0127902 A1 May 7, 2015

(51) Int. Cl.
G06F 12/00 (2006.01)
G06F 3/06 (2006.01)

(52) U.S. Cl.
CPC .......... *G06F 3/0689* (2013.01); *G06F 3/0605* (2013.01); *G06F 3/067* (2013.01); *G06F 3/0652* (2013.01)

(58) Field of Classification Search
None
See application file for complete search history.

(56) References Cited

U.S. PATENT DOCUMENTS

| | | | | |
|---|---|---|---|---|
| 7,979,649 B1 * | 7/2011 | Thiam | ................ | G06F 11/1448 711/161 |
| 2004/0255080 A1 * | 12/2004 | Kihara | ................ | G06F 3/0607 711/114 |
| 2005/0216534 A1 * | 9/2005 | Ikezawa | ............ | G06F 17/30188 707/999.204 |
| 2006/0053250 A1 * | 3/2006 | Saze | .................... | G06F 3/0608 711/114 |
| 2006/0064541 A1 * | 3/2006 | Kano | .................... | G06F 3/0605 711/114 |
| 2006/0075007 A1 * | 4/2006 | Anderson | ............ | G06F 3/0608 711/159 |

(Continued)

OTHER PUBLICATIONS

Wikipedia, Coordinated Universal Time (http://en.wikipedia.org/wiki/Coordinated_Universal_Time), Mar. 3, 2011.*

(Continued)

*Primary Examiner* — Prasith Thammavong
*Assistant Examiner* — Jason W Blust
(74) *Attorney, Agent, or Firm* — Hamilton, Brook, Smith & Reynolds, P.C.

(57) ABSTRACT

A data handling system having a physical storage device and a storage controller responsible for provisioning, managing, and servicing logical unit numbers (LUNs) with self-destruction properties on the physical storage device is disclosed. For a given LUN, the storage controller creates a profile including self-destruction properties, such as a LUN destruction date, and associates the profile with the LUN. The profiles may be independent of file format and content of any associated data and the LUN destruction date may be a function of the last access date of the associated data. The storage controller monitors the LUN destruction date associated with each LUN and determines the last access date of any associated data. The storage controller marks a LUN having a past-due LUN destruction date, notifies a user of an approaching LUN destruction date, and destroys any past-due LUNs.

25 Claims, 4 Drawing Sheets

(56) References Cited

U.S. PATENT DOCUMENTS

| | | | |
|---|---|---|---|
| 2011/0173387 A1* | 7/2011 | Kitagawa | G06F 3/0605 |
| | | | 711/114 |
| 2013/0212440 A1* | 8/2013 | Rom | G06F 11/0709 |
| | | | 714/47.1 |
| 2014/0032838 A1* | 1/2014 | Takeuchi | G06F 3/0647 |
| | | | 711/114 |
| 2015/0149708 A1* | 5/2015 | Nath | G06F 3/0616 |
| | | | 711/103 |

OTHER PUBLICATIONS

Sibbald, Manual do Bacula (http://www.bacula.com.br/manual-do-bacula), Aug. 18, 2013.*

* cited by examiner

SELF DESTROYING LUN

BACKGROUND OF THE INVENTION

Computer users are requiring an ever-increasing amount of electronic storage space. Home computer users' increased storage of multimedia data, especially video and photographic data, has only served to increase the amount of storage space needed. Likewise, industry also requires increased storage space. As more and more business is being conducted electronically, there has been an ever-increasing demand and need for the storage of this vast amount of business data. As a result, there has been a demand to manage the storage lifetime of data in an attempt to decrease the amount of electronic data kept for an indefinite period.

Currently, the majority of this electronic data is stored on magnetic hard disk drive devices. A disk drive is a device implementing disk storage in which data is digitally recorded by various electronic magnetic optical or mechanical methods on disks (also referred to as the media). Disk storage is used in both computer storage and consumer electronic storage (e.g., audio CDs and video disks, standard DVD and Blu-Ray). To that end, disk drives may implement such disk storage with fixed or removable media. Notable types of disk drives are the hard disk drive (HDD) containing a nonremovable disk, the floppy disk drive (FDD) and its removable floppy disk, and various optical disk drives and associated optical disk media.

As the value and use of information continues to increase, individuals and businesses seek additional ways to process and store information efficiently and with less overhead. One option available to users is information handling systems. An information handling system generally processes, compiles, stores, and/or communicates information or data for business, personal, or other purposes thereby allowing users to take advantage of the value of the information. In addition, information handling systems may include a variety of hardware and software components that may be configured to process, store, and communicate information and may include one or more computer systems, data storage systems, and networking systems.

An information handling system may implement a storage controller (also referred to as a storage array or, more generally, a data handling system). The storage controller may have an operating system that presents a logical view of the storage system to a user, and a physical layer manager that manages the actual physical storage devices. The storage controller may manage the location of blocks of data across multiple physical storage devices. With traditional storage management, a logical unit number (LUN) or virtual disk is created and assigned to each application server or user—a process called "provisioning."

An LUN or "Logical Unit Number" is an identifier assigned to a "logical disk." A logical disk can be located on one or more physical storage devices. A logical disk can be further partitioned, to provide logical volumes, virtual disks and other "chunks" of data storage.

Creating a LUN (similar in principle to creating a partition on a computer's hard drive) carves out some portion of empty physical space in a storage array, which is then formally assigned to the particular application or user. Over time, the user or application gradually fills the storage space allocated for the LUN and another LUN can be used.

The present disclosure relates generally to storage arrays and more particularly to techniques for provisioning, managing, and deleting LUNs on physical storage devices containing multiple disk drives and in storage area networks (SAN) where time-life management of data is needed.

SUMMARY OF THE INVENTION

The invention has been developed in response to the present state of the art and, in particular, in response to the problems and needs in the art that have not yet been fully solved by currently available apparatus, systems, and methods. Accordingly, the invention has been developed to provide apparatus and methods to generate, manage, and service logical units (LUNs) in a storage network environment where automatic LUN deletion is necessary. The features and advantages of the invention will be fully apparent from the following description and appended claims, or may be learned by practice of the invention as set forth hereinafter.

Consistent with the foregoing, an apparatus for provisioning, managing, and deleting logical units (LUNs) in a storage network environment is disclosed herein.

An example embodiment of the present invention is a data handling system comprising: (a) a physical storage device containing physical storage media, and (b) a storage controller responsible for provisioning, managing, and servicing logical unit numbers (LUNs) of the physical storage device. The LUNs have associated data (metadata), and for a given LUN, the storage controller creates and associates a profile with the LUN. The associated profile includes an indication of self-destruction properties of the LUN enabling automatic destruction of the LUN. The given LUN may be a group of individual LUNs. The data handling system's physical storage device may include multiple disk drives.

In another embodiment, the data handling system includes the storage controller configured to enforce a policy (for LUN self-destruction) on the LUNs based on one or more profiles of the LUNs. The policy may be a rule-based policy.

In another embodiment, the one or more profiles of the LUNs are independent of file format, file content, and data interpretation of the data stored by the LUNs.

In a preferred embodiment, one of the self-destruction properties indicated in the profile of the given LUN is a LUN destruction date. The LUN destruction date may be time zone aware and time zone independent. In another embodiment, the data handling system monitors the LUN destruction dates of the LUNs at a given frequency. The data handling system may be configured to enable a user to configure the given frequency at which the data handling system monitors the LUNs for destruction date. The data handling system may determine a last access date of a given LUN and may modify the respective LUN destruction date as a function of the determined last access date.

In another embodiment, the data storage controller is configured to inherit the LUN destruction date from a template.

In some embodiments, the storage controller may modify one or more of the profiles associated with the LUNs. In another embodiment, the storage controller associates a profile with two or more LUNs. In another embodiment, the storage controller removes a profile from one or more LUNs.

In another embodiment, the storage controller marks as a "past-due" LUN, a LUN having in its profile a past-due LUN destruction date. The storage controller may notify a user of an approaching LUN destruction date within a given time period. In a preferred embodiment, the storage controller destroys the past-due LUN by performing one of a soft delete, a permanent delete, and a secure delete, of the associated logical disk space and/or identifier (logical unit number) thereto.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
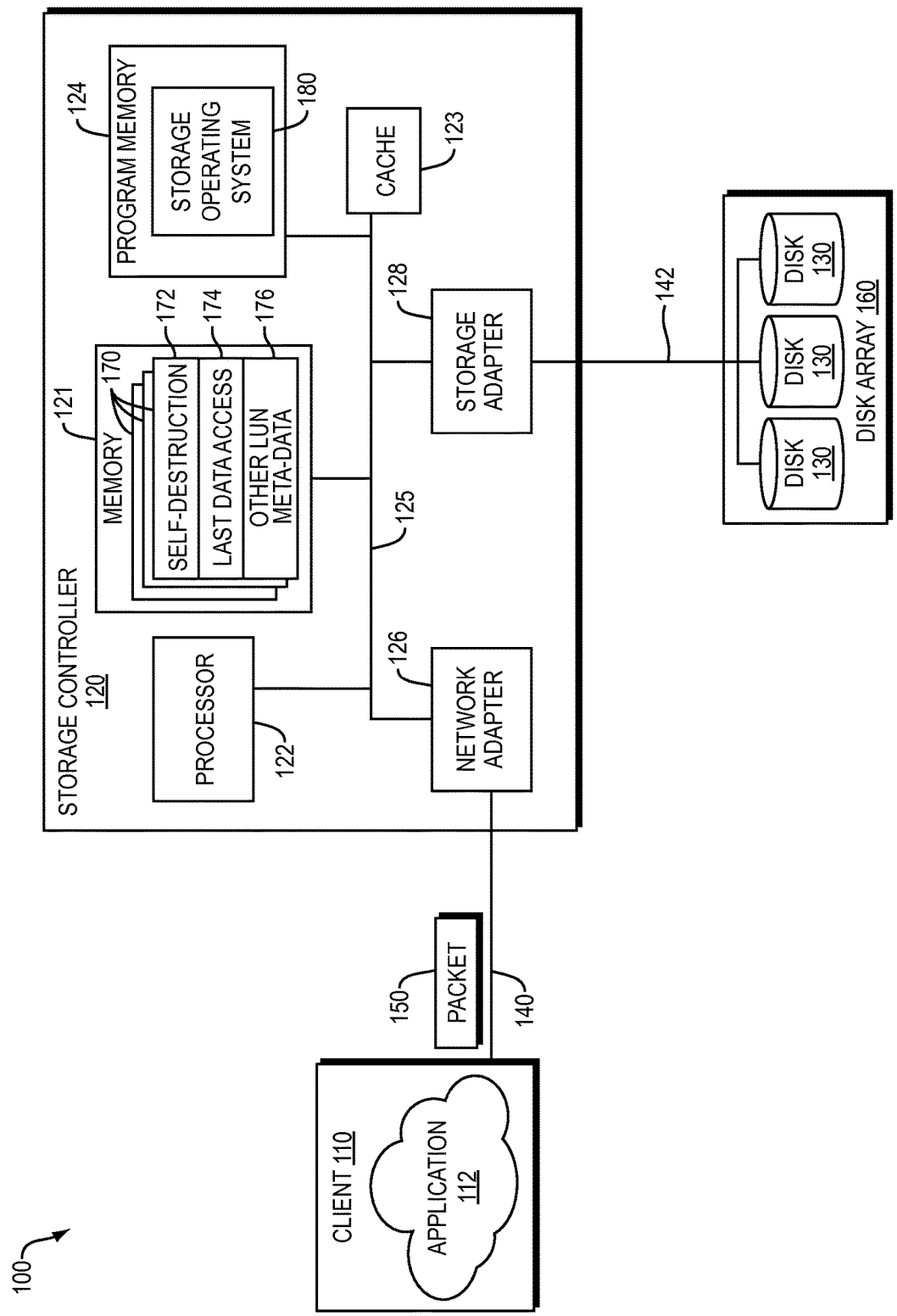
FIG. 1 is a schematic block diagram of an environment including a storage system in accordance with an illustrative embodiment of the present invention.

A description of example embodiments of the invention follows.

The present disclosure relates generally to information handling systems and more particularly to techniques that avoid archiving and storing of electronic data beyond a predetermined expiration date by provisioning logical unit numbers (LUNs) with self-destruction properties, automatically monitoring the LUNs, and deleting any past-due LUNs.

End-user computer applications require electronic data storage to operate. With traditional storage management, a logical unit number (LUN) is created and assigned to each enterprise application—a process called "provisioning." Creating a LUN (similar in principle to creating a partition or virtual disk on a single hard disk drive) carves out some portion of empty physical space in a storage array, which is then formally assigned to the particular application. Applications or users over time gradually fill the storage space allocated for the LUN.

SAN (storage area network) clients typically identify and address the stored information (in storage devices associated with a storage appliance) in the form of blocks or disks by LUNs. A LUN can generally be viewed in concept as a logical unit of storage that is carved out of volumes of storage space. As an example configuration, a volume size can be three times the size of a LUN (e.g., a 3-terabyte volume versus a 1-terabyte LUN).

Computer systems may interact with storage arrays of attached storage systems via storage array controllers. The storage array controllers may present the storage units of the storage arrays as virtual partitions (or volumes). A LUN is the logical address of a virtual partition (or volume) of the storage array, and by extension is the name reference to or identifier of the virtual partition itself.

However, traditionally provisioned SANs containing prior art LUNs face several problems. Traditional LUNs must be deleted manually because they do not contain parameters for determining a life-time or date of expiration. Commonly LUNs are deleted if they contain data not accessed by a user in many years or if a legal responsibility (e.g., requiring the data for an employee or group of employees to be preserved for a certain time), has been fulfilled or expired. LUNs may be specific to a user or application (e.g., an employee's personal drive, or achieved emails). Deleting one or more prior art LUNs requires a user to determine which LUNs are to be deleted, often by inspecting their contents or referring to a database reference, and then instructing the storage controller to execute the delete. The storage controller then deletes the old LUN and a new one may be created to provide additional storage space. The contents of the original LUN are written over if a secure delete is used, or simply readdressed as free space in one or more new LUNs if a standard delete is requested.

Embodiments of the present invention allow a user to have one or more LUNs and all the data stored as part thereof destroyed automatically at a pre-specified date. By having this new self-destroying property and behaviors of self-destruction, the user or consumers of the LUN do not have to remember or manage when to destroy the LUN and all the data stored on the LUN. The managing and implementing of LUN destruction utilizing indication of the self-destruction properties of the LUNs is done automatically by the storage controllers. Embodiments of the present invention eliminate the need to manually delete a LUN containing time-limited data and enable a storage controller to manage virtual storage space using pre-determined time-based directives with an option for user override at a later time.

In an embodiment of the invention, an apparatus uses a LUN data type for storage allocation. The apparatus includes a storage appliance that applies at least one self-destruction property to one or more LUNs. The self-destruction properties can include a time parameter, such as a specific time and date for the deletion (destruction) of the LUN. The deletion time can be further defined as a function of the date/time of last access of data on the LUN. The storage controller monitors the LUNs at a given frequency and updates the last access date of the LUN if necessary. The storage controller flags (or marks) for deletion any LUNs having a past-due self-destruction parameter and optionally notifies a user, client, or the data handling system of the pending LUN deletion. The storage controller can immediately delete the past-due LUN or wait a predetermined period of time to allow a user to respond, or hold the delete indefinitely until a user permits the pending deletion. By embodiments specifying a self-destruction parameter for a LUN, the storage management controller of the data handling system can allocate data for the LUNs in a more intelligent manner, by allocating specific data blocks for LUNs having different expiration date.

Referring to FIG. 1, a schematic block diagram of a computer/digital process environment 100 including a storage controller 120 that may be advantageously used with the present invention is shown. The storage controller 120 is a computer that provides storage service relating to the organization of information on storage devices, such as disks 130 of a disk array 160. The storage controller 120 comprises a processor 122, a memory 124, a network adapter 126 and a storage adapter 128 interconnected by a system bus 125. The processor 122 manages the overall operation of the storage controller 120 to process received I/O requests from client 110. Processor 122 fetches program instructions from program memory 124 via system bus 125. Methods of the present invention are therefore preferably embodied as programmed instructions within program memory 124 operable within processor 122 of storage system 120.

The storage controller 120 also includes a storage operating system 180 that preferably implements a high-level module, such as a file system, to logically organize the information as a hierarchical structure of directories, files and special types of files called virtual disks or LUNS on the disks 130.

In the illustrative embodiment, the memory 124 comprises storage locations that are addressable by the processor 122 and adapters 126, 128 for storing software program code. The processor 122 and adapters 126, 128 may, in turn, comprise processing elements and/or logic circuitry configured to execute the software code and manipulate the data structures. Storage operating system 180, portions of which are typically resident in memory 124 and executed by the processing elements, functionally organizes the system 120 by, inter alia, invoking storage operations executed by the storage controller 120. It will be apparent to those skilled in the art that other processing and memory means, including various computer readable media, may be used for storing and executing program instructions pertaining to the inventive technique described herein.

The network adapter 126 comprises the mechanical, electrical, and signaling circuitry needed to connect the storage controller 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage controller over the network 140 by exchanging discrete frames or packets of data 150 according to pre-defined protocols, such as the Transmission Control Protocol/Internet Protocol (TCP/IP). In like manner, storage adapter 128 provides the interface between processor 122 and disk array 160 via path 142 and processor bus 125. Interfaces 126 and 128 are well-known commercially available devices designed to adapt signals between processor bus 125 and either path 140 or 142 in accordance with the selected media and protocol of their respective interfaces.

Those skilled in the art will readily recognized that paths 140 and 142 may be implemented using any of several well-known industry standard communication media and protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The client 110 may be a general-purpose computer configured to execute applications 112. Moreover, the client 110 may interact with the storage controller 120 in accordance with a client/server model of information delivery. That is, the client 110 may request the services of the storage controller, and the system may return the results of the services requested by the client, by exchanging packets 150 over the network 140. Processing of the I/O requests generally involves performing lower-level I/O operations on disk array 160 via path 142. Disk array 160 comprises a plurality of disk drives 130 that are in turn logically subdivided by storage management methods of the storage controller 120 into a plurality of logical units (LUNs). In some embodiments, each LUN is managed by storage controller 120 in accordance with an associated RAID storage management level (i.e., RAID levels 0 through 6).

Storage of information on array 160 is preferably implemented as one or more storage "volumes" that comprise a collection of physical storage disks 130. Each logical volume is generally, although not necessarily, associated with its own file system. The disks within a logical volume/file system are typically organized as one or more groups, wherein each group may be operated as a RAID. Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

The storage adapter 128 cooperates with the storage operating system 180 executing on the storage controller 120 to access information requested by a user (or client) at 110. The information may be stored on any type of attached array of writable storage device media. However, as illustratively described herein, the information is preferably stored on the disks 130, such as HDD and/or DASD, of array 160. The storage adapter 128 includes input/output (I/O) interface circuitry that couples to the disks 130 over an I/O interconnect arrangement, such as a conventional high-performance, FC serial link topology. In alternative embodiments, the disks (writeable storage device media) 130 may comprise electronic media, e.g., Flash memory, etc. As such, the illustrative description of writeable storage device media comprising magnetic media (e.g., disks 130) should be taken as exemplary only.

Cache memory 123 enhances performance of storage controller 120 in processing I/O requests received from clients (also referred to as host systems) 110. In general, I/O write requests are processed by temporarily storing modified information in cache memory 123 and later flushing or posting such cached information through storage adapter 128 to disk array 160 for persistent storage on disks 130. In like manner, I/O read requests are more rapidly processed by retrieving requested information from cache memory 123. Cache memory management methods and architectures are well known to those skilled in the art.

To facilitate access to the disks 130, the storage operating system 180 implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named LUNs.

Memory 121 is a random access memory subsystem utilized for purposes of storing and retrieving management information regarding each LUN in disk array 160. Each LUN in disk array 160 has a corresponding LUN meta-data structure 170 that describes required management information to manipulate a corresponding LUN. Each LUN meta-data structure 170 includes the LUN's self-destruction parameters 172, last data access date 174, and other LUN meta-data 176.

Other LUN meta-data 176 includes information required for RAID storage management of the LUN. Most RAID storage systems provide access to a LUN in storage units referred to as blocks. The user views the LUN as a sequence of logical blocks identified by sequential block numbers through the number of blocks allocated in the LUN. Depending on the RAID management level associated with the LUN, these logical block numbers are mapped or translated into corresponding physical block numbers—physical locations on the disk drives. Other LUN meta-data 176 therefore includes mapping information describing a logical to physical mapping of blocks within the LUNs as well as information regarding the desired RAID management level to be used in manipulating the corresponding LUNs. Such mapping of blocks in accordance with RAID management levels is well known to those skilled in the art. Other status and configuration information regarding the particular LUNs is also stored in other LUN meta-data 176.

It is expressly contemplated that any appropriate storage operating system may be enhanced for use in accordance with the inventive principles described herein.

Those skilled in the art will readily recognize that FIG. 1 is intended to be representative of a wide variety of possible storage system architectures that may embody the methods and structures of the present invention. It is understood that there are other storage systems and controller architectures in which the methods and associated structures of the present invention may be advantageously applied.

Figure 2:
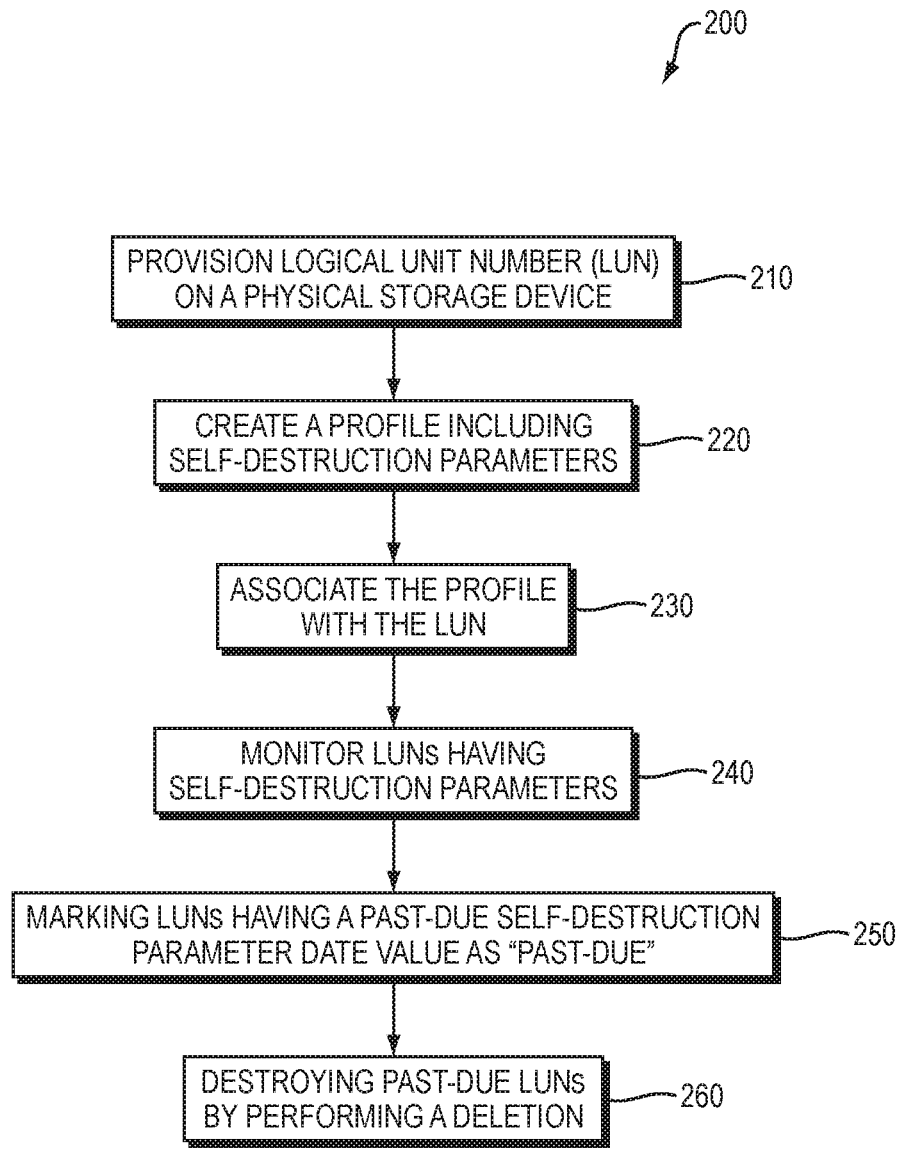
FIG. 2 is a flowchart of a LUN handling process embodying methods of the present invention in the storage system of FIG. 1.

FIG. 2 is a flowchart detailing the steps of storage controller procedure 200 for performing provisioning and deleting of LUNs with self-destruction properties in accordance with an illustrative embodiment of the present invention. Processor 122 executes procedure 200, which begins in step 210. At step 210 the storage management controller 120 provisions a LUN on a physical storage device, such as a physical disk drive 130 or an array of physical disk drives 160. In alternative embodiments, the LUN provisioning does not occur because a LUN is already provisioned. As such, the provisioning of the LUN should be taken as exemplary only because embodiments of the present invention can be applied to LUNs managed by the storage management controller 120 after they have been provisioned.

Once the LUN has been provisioned, the storage management controller 120 creates for the LUN a profile (in respective meta-data structure 170) that includes indications of self-destruction properties (parameter values 172) in step 220. Alternatively the profile may be inherited from a LUN already assigned with a profile containing self-destruction properties (parameter values 172) or may be specified by a user during step 220. Preferably the self-destruction properties include an expiration date for the LUN, preferably according to data contained or to be contained in the LUN. Once a profile has been created in step 220, the storage management controller 120 associates the profile with the LUN in step 230. The profile may be associated with one or more LUNs in this step. The self-destruction parameters 172 can be associated with the LUN by being written in a meta-data structure 170 associated with the LUN. The meta-data structure 170 can be stored in any memory location (internal or external to the storage disks 130 of the LUN) accessible by the storage management controller 120.

In step 240, the storage management controller 120 monitors LUNs having self-destruction properties by comparing the current date or system date against the respective date parameter value 172 of the self-destruction properties of each LUN. If the LUN has a self-destruction date 172 past the current date, the storage management controller 120 marks the LUN as a past-due LUN in step 250. In step 260 the storage management controller 120 destroys any marked past-due LUNs by performing a deletion of the LUN. The LUN deletion is preferably one of a secure delete, soft delete, or normal delete. A secure delete involves overwriting the data of the past-due LUN and addressing the physical data locations (i.e., logical data space) of the LUN as free space. A normal delete only addresses the physical data locations of the LUN as free space. A soft delete marks the LUN identifier (logical unit number) as deleted (non-provisioned) but allows a user to undo the operation at a later date.

In alternative embodiments, process 200 allows or enables a user to optionally cancel the pending in step 250. As such, the deletion of the LUN by the storage management controller 120 (step 260) may be configured as automatic or requiring a user to approve the scheduled deletion.

In the foregoing manners, embodiments of the present invention advantageously provide self-destruction LUNs that effectively automatically destruct as needed and desired in the art.

Figure 3:
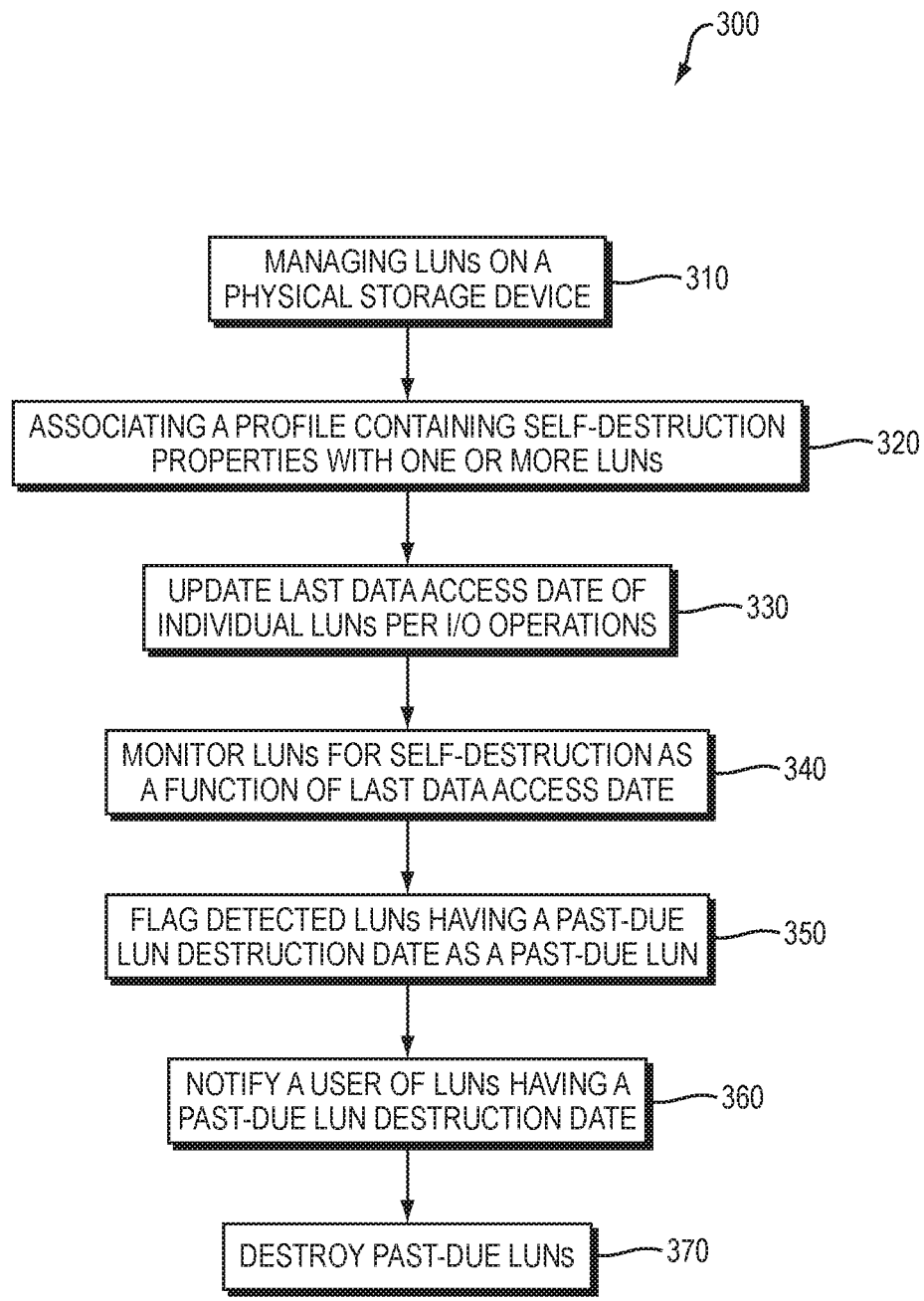
FIG. 3 is a further flowchart illustrating the process of FIG. 2 with additional methods of the present invention.

Referring to FIG. 3, an alternative embodiment of storage controller 120 operation and process is presented as procedure 300. The illustrated flowchart details the steps of storage controller procedure 300 for managing and deleting LUNs as a function of destruction dates and last data access dates of LUNs in accordance with principles of the present invention. The procedure 300 begins in step 310 where the storage management controller 120 manages existing LUNs on a physical storage device, such as a physical disk drive 130 or an array of physical disk drives 160. Embodiments of the present invention can be applied to LUNs provisioned by the storage management controller 120 or serviced by the storage management controller 120 at any time.

The storage management controller 120 at step 300 associates each subject LUN with a respective profile having indications of self-destruction properties. Preferably the self-destruction properties include: a LUN destruction date 172 and a date of last access 174. Alternatively the profile may be inherited from a LUN already assigned with a profile containing self-destruction properties or may be specified by a user during step 320. The last data access date 174 of a LUN is the date of the most recent occurrence of a host or client system 110 accessing or writing data to the LUN. Step 330 of storage controller 120 monitors and updates the last data access date (field value) 174 in data structure 170 for each I/O (read or write) request of disk 130 storage. As described above, the self-destruction parameters can be meta-data of the LUN stored in a data structure 170 associated with the LUN (i.e., stored in the LUN, or external to the LUN) and accessible by the storage management controller 120.

Once a profile has been associated with a LUN in step 320, the storage management controller 120/step 340 monitors one or more LUNs having a LUN destruction date. The monitoring of step 340 is at a given frequency. The frequency may be a user-definable parameter. The storage management controller 120 monitors the LUNs by determining their LUN destruction date 172 (from meta-data 170) as a function of the last data access date 174 and comparing the current system date against the LUN destruction date 172 of each LUN. The self-destruction date 172 may include a user-definable system 120 parameter or constant in a function including the last data access date 174. If a LUN has a self-destruction date 172 past the current date, the storage management controller 120/step 350 marks the LUN for destruction, i.e. as a past-due. In step 360, the storage management controller optionally notifies a user of any flagged past-due LUNs a can be configured to allow or require a user to confirm or reject a pending LUN destruction.

In step 370, the storage management controller 120 destroys any past-due LUNs by performing a deletion of the LUN as described above in FIG. 2. The LUN deletion is preferably one of a secure delete, soft delete, or normal delete.

Figure 4:
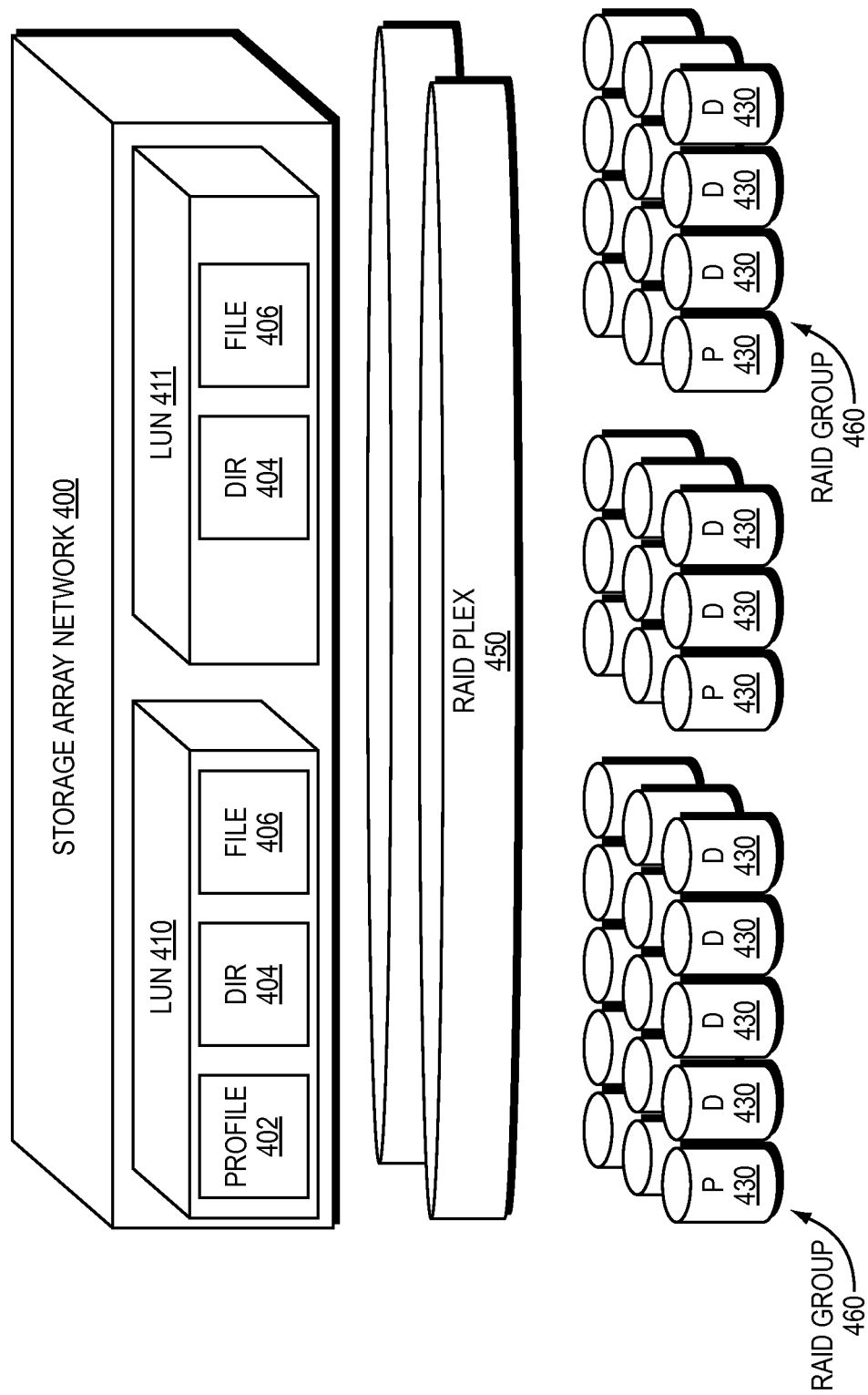
FIG. 4 is a schematic block diagram depicting a typical RAID configuration in which embodiments of the present invention are employed.

FIG. 4 is a schematic block diagram of an SAN 400 in accordance with an illustrative embodiment of the present invention. Users of the SAN 400 observe each LUN 410, 411 as a representation of disk storage similar to an individual local hard disk. Each LUN 410, 411 has respective directories 404 and files 406. For non-limiting example, LUN 410 contains a profile 402 in accordance with principles of the present invention.

The profile 402 contains indication of self-destruction properties, preferably a self-destruction date 172. The profile 402 may also contain a last data access date 174 for the LUN 410. The storage controller 120 may process the self-destruction of LUN 410 as a function of the self-destruction parameter 172 alone or in combination with the last data access date 174 of LUN 410 as described in FIGS. 2 and 3. That is, storage controller 120 is configured to enforce a policy (for LUN destruction) on LUN 410 based on one or more profiles 402. The policy may be rules based or otherwise implemented as illustrated in FIGS. 2 and 3 above. It is noted that the profiles 402 are independent of file format, file content, and data interpretations of the data 404, 406 stored on LUN 410. Rather, the profiles 402 provide or define a data type of the LUNs 410, 411 that is used for determining LUN self-destruction. In this way, embodiments of the present invention advantageously provide self-destroying LUNs 410 that effectively automatically self-destruct.

The LUNs 410, 411 are illustratively layered on top of the RAID system, which is represented by at least one RAID plex 450 (depending upon whether the storage configuration is mirrored), wherein each plex 450 comprises at least one RAID group 460. Each RAID group further comprises a plurality of disks 430, e.g., one or more data (D) disks and at least one (P) parity disk.

Whereas each LUN 410, 411 is analogous to a physical volume of a conventional storage system, a flexible volume is analogous to a file within that physical volume. That is, the SAN 400 may include one or more LUNS with 410 or without 411 profiles 402. The sum of the storage disk space consumed by the LUNs 410, 411 is physically smaller than (or equal to) the size of the overall physical volume of the RAID group 460 on which the data of the LUNs 410, 411 resides.

As will be appreciated by one skilled in the art, the self-destroying LUNs of the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described above with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more data storage devices (that may for example be disk drives), one or more network ports for communicating with external devices as well as various input and output (I/O) devices, such as a keyboard, a mouse, and a video display. The information handling system may also include one or more buses operable to transmit communications between the various hardware components.

While this invention has been particularly shown and described with references to example embodiments thereof, it will be understood by those skilled in the art that various changes in form and details may be made therein without departing from the scope of the invention encompassed by the appended claims.

What is claimed is:

1. A data handling system for allocating time limited data to a given group of logical unit numbers (LUNs), comprising:
    a physical storage device containing physical storage media;
    a storage controller responsible for provisioning, managing, and servicing LUNs on the physical storage device, the storage controller configured to:
        for respective groups of LUNs, each respective group comprising two or more LUNs, create and store an associated respective profile within each group of LUNs, each profile including self-destruction properties enabling automated destruction of the group of LUNs, wherein the self-destruction properties are time based;
        setting the self-destruction properties of each profile according to data to be contained in the respective group of LUNs associated with each profile; and
        allocate time limited data to a given group from the respective groups of LUNs, the given group selected according to the self-destruction properties of the profile stored within the given group.

2. The data handling system of claim 1, wherein the physical storage device includes multiple disk drives.

3. The data handling system of claim 1, wherein said storage controller is configured to enforce a policy on said LUNs, the policy based on one or more profiles.

4. The data handling system of claim 3, wherein the policy is a rule-based policy.

5. The data handling system of claim 3, wherein each profile is independent of file format, file content, and data interpretation of said data to be contained in each respective group of LUNs.

6. The data handling system of claim 1, wherein one of said self-destruction properties is a LUN destruction date.

7. The data handling system of claim 6, wherein the LUN destruction date is time zone aware and time zone independent.

8. The data handling system of claim 6, wherein said storage controller is configured to inherit said LUN destruction date from a template.

9. The data handling system of claim 1, wherein said storage controller modifies a profile.

10. The data handling system of claim 1, wherein said storage controller removes a profile from one or more LUNs.

11. The data handling system of claim 1, wherein one of said self-destruction properties is a LUN destruction date and said storage controller monitors a LUN destruction date of the given group of LUNs at a given frequency.

12. The data handling system of claim 11, wherein the storage controller determines a last access date for the given group of LUNs.

13. The data handling system of claim 12, where said storage controller modifies the LUN destruction date of the given group of LUNs as a function of the last access date.

14. The data handling system of claim 11, wherein said storage controller enables a user to configure said given frequency.

15. The data handling system of claim 11, wherein said storage controller marks a LUN having a past-due LUN destruction date as a past-due LUN.

16. The data handling system of claim 11, wherein said storage controller notifies a user of an approaching LUN destruction date within a given time period.

17. The data handling system of claim 15, wherein said storage controller destroys said past-due LUN by performing one of a soft delete, a permanent delete, and a secure delete.

18. A computer based method for allocating time limited data to a given group of logical unit numbers (LUNs), the method comprising:
    provisioning LUNs on a physical storage device, said physical storage device having one or more associated physical storage media;
    creating multiple profiles, each profile having self-destruction properties, wherein the self-destruction properties are time based;
    storing each profile within an associated respective group of LUNs, each group comprising two or more LUNs;
    setting the self-destruction properties of each profile according to data to be contained in the respective group of LUNs associated with each profile; and
    allocating time limited data to a given group of LUNs, the given group selected according to the self-destruction properties of the profile stored within the given group.

19. The method for claim 18, wherein creating multiple profiles includes:
    creating profiles independent of file formatting, file content, and data interpretation of said data to be contained in each group of LUNs.

20. The method of claim 18, wherein the self-destruction properties include a LUN destruction date.

21. The method of claim 20, further including:
    determining a last access date of the given group of LUNs; and
    modifying a LUN destruction date of the given group of LUNs as a function of the last access date.

22. The method of claim 20, further including:
    monitoring a LUN destruction date of a group of LUNs; and
    marking a LUN having a past-due LUN destruction date as a past-due LUN.

23. The method of claim 22, further including:
    notifying a user of an approaching LUN destruction date within a given time period.

24. The method of claim 22, further including:
    destroying said past-due LUN by performing one of a soft delete, a permanent delete, and a secure delete.

25. A non-transitory computer readable medium for allocating time limited data to a given group of logical unit numbers (LUNs), the medium having stored thereon a sequence of instructions which, when loaded and executed by a processor coupled to an apparatus, causes the apparatus to:
    provision LUNs on a physical storage device, said physical storage device having one or more associated physical storage media;
    create multiple profiles, each profile having self-destruction properties, wherein the self-destruction properties are time based;
    store each profile within an associated respective group of LUNs, each group comprising two or more LUNs;
    setting the self-destruction properties of each profile according to data to be contained in the respective group of LUNs associated with each profile; and allocate time limited data to a given group of LUNs, the given group selected according to the self-destruction properties of the profile stored within the given group.

* * * * *